United States Patent Office 3,552,205
Patented Jan. 5, 1971

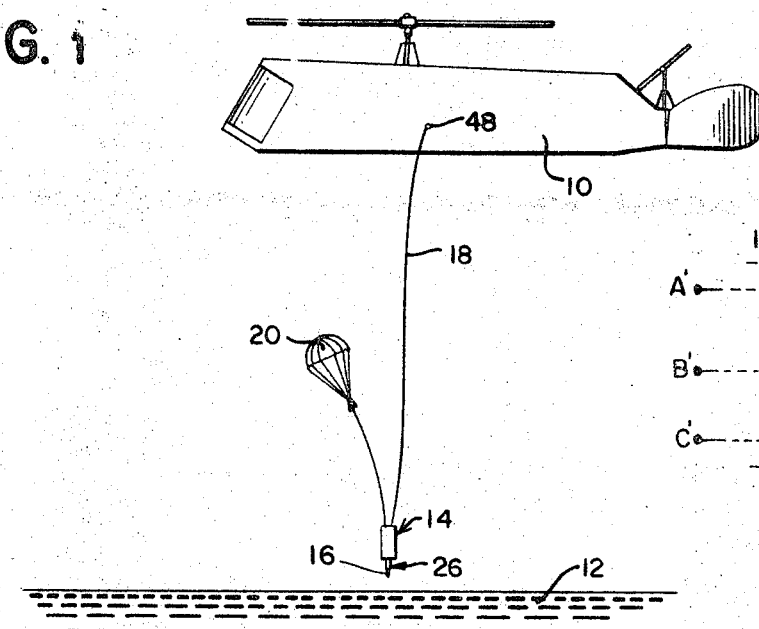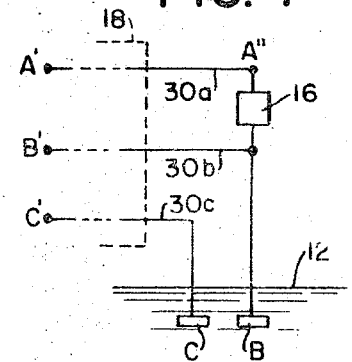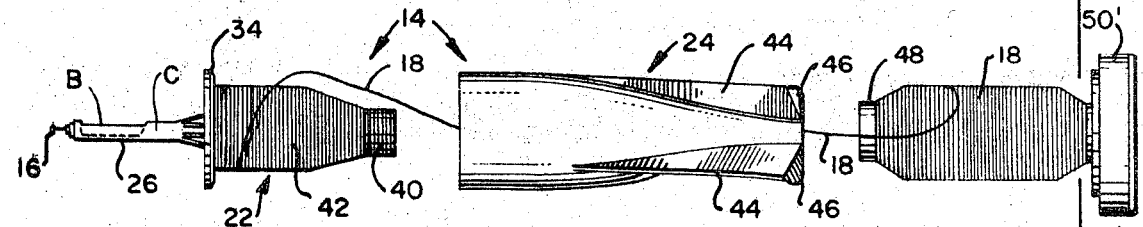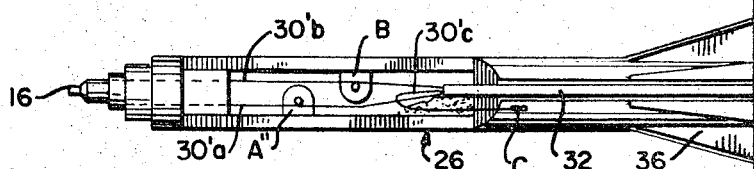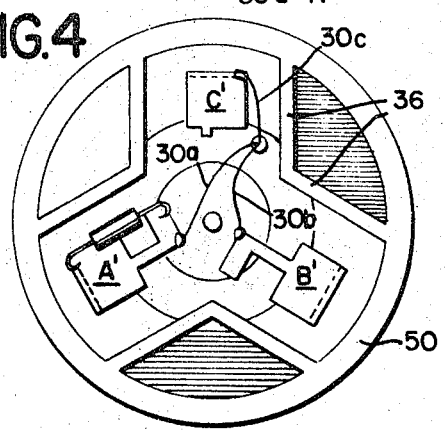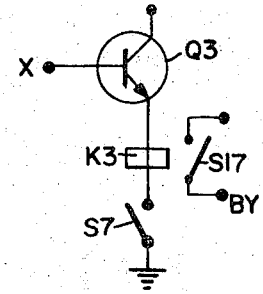
INVENTOR
SAMUEL A. FRANCIS
ATTORNEYS

3,552,205
APPARATUS FOR MEASURING PROPERTIES OF A FLUID BODY FROM AN AIRBORNE VEHICLE
Samuel A. Francis, Marion, Mass., assignor to Buzzards Corp., Marion, Mass., a corporation of Massachusetts
Filed July 24, 1968, Ser. No. 747,191
Int. Cl. G01d 1/10
U.S. Cl. 73—170                                    7 Claims

ABSTRACT OF THE DISCLOSURE

A probe containing a property sensing element and two electrodes of a "sea switch" is deployed from the airborne vehicle and is electrically connected by a three-wire cable to a bridge measuring circuit and recorder located aboard the vehicle. When the probe lands in the fluid the two electrodes are connected by the conductive fluid, the sensing element becomes a measured part of the bridge circuit, and a signal is produced to initiate the operation of a balancing servosystem and of the recorder.

BACKGROUND OF THE INVENTION

(1) Field of the invention

This invention generally relates to an apparatus for measuring the property of a fluid medium, and in particular to an apparatus of the type which is adapted to be deployed from an airborne vehicle such as a helicopter.

(2) Description of the prior art

It is often desirable to obtain accurate determinations of certain properties of a body of water. Scientific studies of biologic life and the mineral contents of a body of water require the knowledge of the temperature and salinity of the water. The knowledge of these properties is also useful for the operation of sonar systems which may be employed for detecting schools of fish or underwater vehicles.

It is also often desirable to be able to obtain a measurement and recordation of these properties at various depths of the water.

One means for measuring the above described properties of the water, as well as other properties of which information is desired, is the deployment of a bathythermograph probe into the water medium. The probe contains a property sensing device, the impedance of which is proportional to the property of the water under observation.

A probe of this type is described in U.S. Pat. No. 3,221,556, issued Dec. 7, 1965, entitled "Bathythermograph System."

As described in the aforesaid application, the probe includes a property sensing device such as a thermistor, the resistance of which is related in a known manner to the temperature of the water. The probe is cast into the water from a waterborne vehicle which houses measuring and recording apparatus electrically connected to the thermistor. As the probe falls in the water, the changes in the resistance of the thermistor are recorder on a recorder, in which the recording medium is advanced at a rate proportional to the known rate of descent of the probe into the water.

However, the speed and the potential area of coverage of a waterborne vessel are limited. When measurements of water properties are desired for a large area of water, the time and expense necessary for this operation when carried out from a waterborne vessel may often prove to be excessive.

Also when measurements of the water properties are to be taken at locations distant from one another, the time required for the waterborne vessel to traverse the distance between these points is excessive and would cause undue delay and expense.

To overcome these disadvantages of the known water property measuring apparatus, the present invention provides a system of the type described, which is adapted to be deployed into the water from an airborne vehicle, such as a helicopter, having a velocity and mobility far exceeding that of a waterborne vehicle used for the same purpose.

SUMMARY OF THE INVENTION

Accordingly, it is a general object of the present invention to provide an apparatus for measuring properties of a body of water, which is adapted to be deployed or launched into the water from an airborne vehicle.

It is a further object of this invention to increase the area in which measurements of water properties may be economically made.

It is another object of the present invention to provide an apparatus wherein a bathythermographic probe containing a sensing element is deployed from an airborne vehicle.

Another object of the present invention is to provide an apparatus for measuring and recording the properties of a body of water as a function of water depth.

It is yet a further object of the present invention to provide an airborne, water property and recording apparatus wherein the recording operation is initiated at the moment the sensing probe lands in the water.

It is still another object of the present invention to provide a water property measuring apparatus, wherein means are provided to control the rate of descent of a sensing probe from an airborne vehicle prior to the landing of the probe in the water medium.

Briefly stated, in accordance with the present invention an airborne water property measurement and recording apparatus is provided. The airborne vehicle houses means for launching or deploying a probe into the water medium below. The probe contains a property sensing element, such as a thermistor and sea electrodes for closing a circuit by means of conductive sea water. The sensing element and sea electrodes are connected by means of a three-wire conductor to a measuring bridge circuit located aboard the airborne vehicle. The resistance in the sensing element varies as a function of the water property. The variation of the resistance of the sensing element causes an unbalance in the bridge circuit, which unbalance is corrected in a manner more completely described in U.S. Pat. No. 3,341,757, issued Sept. 12, 1967 and entitled "Bridge Circuit for Determining the Inverse of Resistance." The bridge measuring circuit is associated with a servosystem operating a recording system to produce a record of the measurement as a function of the depth of the water.

BRIEF DESCRIPTION OF THE DRAWINGS

The invention will be better understood when taken in conjunction with the following description and the drawing in which:

FIG. 1 is a schematic illustration of the environment in which the present invention has particular utility;

FIG. 2 is an exploded view of the probe assembly utilized in this invention;

FIG. 3 is a detailed view of one section of the probe assembly shown in FIG. 2;

FIG. 4 is a sectional view looking in the direction of the arrows A—A in FIG. 2;

FIG. 6 is an output circuit of a recorder trigger; and

FIG. 7 is a schematic diagram of sea electrodes.

DESCRIPTION OF THE PREFERRED EMBODIMENT

Figure 5:
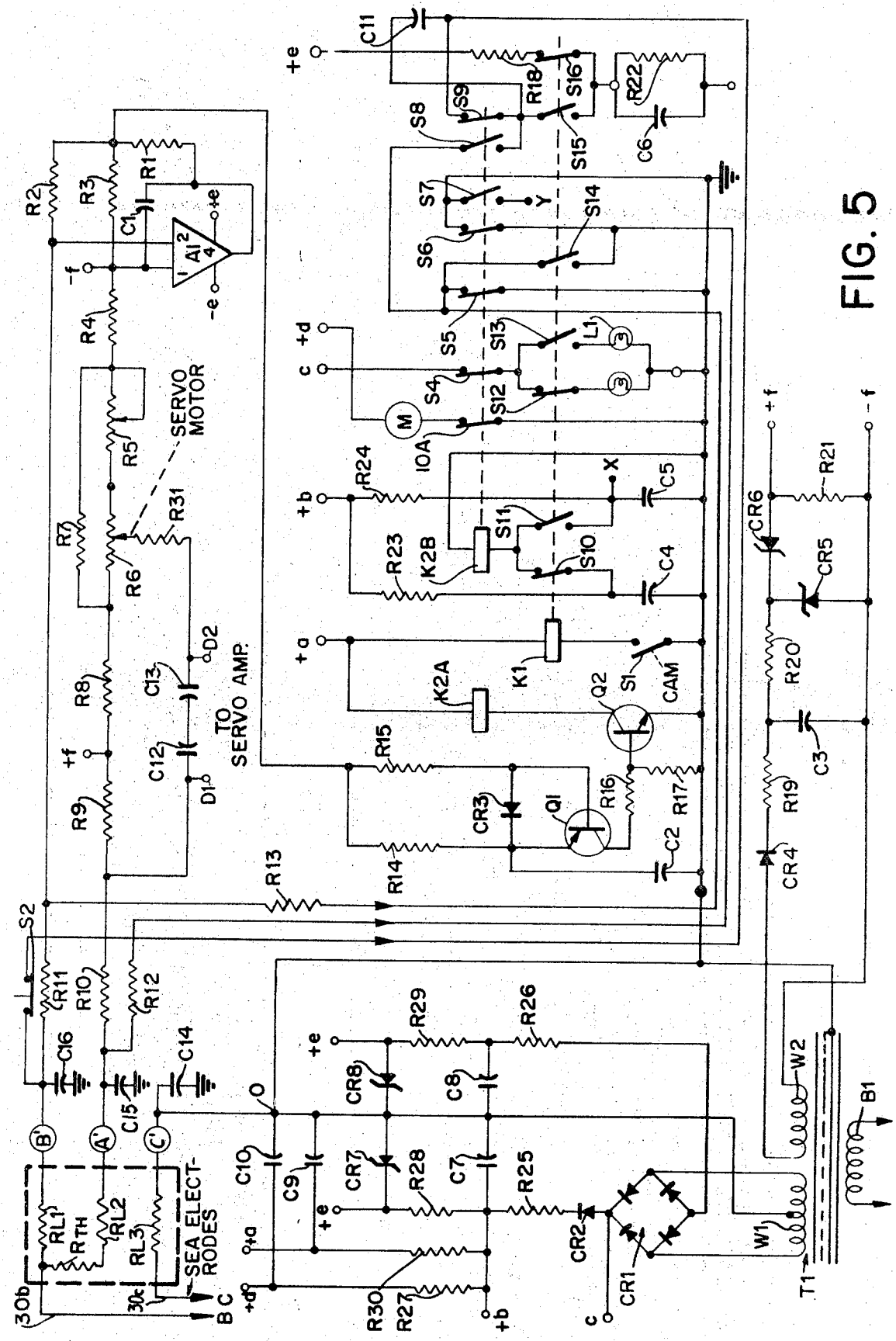
FIG. 5 is a circuit diagram of the electronic measuring and recording system preferably used in conjunction with the probe assembly shown in FIG. 2.

The mode of operation of the present invention is illustrated in FIG. 1. An airborne vehicle, such as a helicopter 10 is shown hovering over a body of fluid, such as water 12, certain properties of which are of interest. A probe assembly 14 is deployed from the helicopter 10, by launching means (not shown) located within the helicopter. The probe assembly 14 carries cylindrical sea electrodes portion 26 and a property sensing element 16 at its end. The sensing element 16, is a thermistor having a varying resistance which is a function of the water temperature being measured. It will be understood that other properties of the water medium such as water salinity or conductivity may be measured by means of an appropriate type of sensing element 16.

After the launching from the helicopter 10, the probe assembly 14 begins to free fall towards the surface of the water. A three-wire conductor 18 extends from the probe assembly 14 to the helicopter. If the probe assembly 14 were allowed to freely accelerate, its velocity prior to striking the water surface may produce an excessive force on conductor 18, causing conductor 18 to break.

To avoid this, a parachute assembly 20 is detachably secured to one end of the probe assembly 14, which is caused to open during the descent of the probe assembly 14 to thereby decelerate the probe assembly to a sufficiently reduced velocity at which there will be no danger of breaking the conductor 18.

As soon as the probe assembly 14 strikes the surface of the water, the parachute assembly 20 becomes detached from the probe assembly 14 to permit the probe assembly 14 to begin its descent into the body of water 12. The release mechanism (not shown) may be a pressure sensitive member, such as a strain gauge, secured to the probe housing, which transmits a surge of current when the probe lands in the water. The current surge would be conducted to operate a relay arranged in an appropriate circuit with an electro-magnet so as to release the parachute assembly from the probe assembly 14 at the appropriate time.

The parachute release mechanism may also be operated in conjunction with a "splash-down" circuit associated with the measuring and recording circuitry located aboard the helicopter 10. This circuitry, which is described in detail, in a later part of this specification, provides an electrical indication of the moment at which the probe assembly 14 strikes the surface of the water.

Referring now to FIGS. 2–4, the construction of the expendable probe assembly 14 is comprised of two sections, spool section 22 and the afterbody section 24. Section 22 is provided with an elongated hollow cylindrical portion 26. A thermistor 16 coated with a suitable compound to resist contamination by the water, extends through an opening at one end of the cylindrical portion 26. Portion 26, also contains sea electrodes designated as B and C. The sea electrode C is secured on the outer surface of the portion 26 whereas the sea electrode B is placed within the open interior of this portion 26 and electrically insulated therefrom so that the connection between the two electrodes can be attained only by conductivity of the sea water 12. Thermistor 16 is connected by means of conductor 30'a to a coated terminal A" and by means of conductor 30'b to the sea electrode B. The terminal A" and sea electrodes B and C are soldered to respective ends of the three wire cable 18.

The three wire cable 18 passes through insulating tubing 32, concentrically arranged within the interior of cylindrical portion 26.

Cylindrical probe portion 26 is connected to a front wall 34 of the spool section 22 by means of symmetrical, radial mounting struts 36, which extends through a central opening formed in wall 34 into the spool section 22. Wall 34 also provides a mounting base for spool or bobbin 42 upon which the three wire conductor 18 is wound. The spool 22 is tapered at the end thereof to facilitate stripping, and terminated with an auxiliary bobbin 40.

After three wire cable 18 has been completely wound on spool 42, section 22 is inserted into the ballistically shaped afterbody section 24 to form the completed probe assembly 14. Afterbody section 24 is made of a molded material such as plastic and includes stabilizing fins 44 symmetrically arranged about its end portion. The rate of the descent of the probe assembly 14 into the water is determined by the overall weight and volume of the probe assembly 14. Manufacturing errors may introduce asymmetrical pressure gradients, which will cause the probe descent to be directed away from the vertical. To compensate for this possible deviation in the course of the probe which would introduce errors into the measurement record, offset portions 46 are provided on the ends of fins 44 to cause the probe to rotate about its vertical axis during its descent into the water.

From the opposite end, three wire cable 18, is wound upon a spool 48 mounted within the airborne vehicle 10. The spool 48 is integral with a terminal canister 50 supporting terminals A', B' and C' for respective opposite ends of wires 30a, 30b and 30c of the three wire cable 18.

When the probe assembly 14 is deployed into the water in the manner illustrated in FIG. 1, the canister 50 and spool 48 remain in the helicopter. As the probe assembly falls conductor 18 unwinds from airborne spool 48 until the time at which the probe assembly strikes the water. As the probe assembly 14 then begins its descent into the water conductor 18 unwinds from spool 42 within the probe assembly. The length of conductor 18 wound on spool 42 should, therefore, equal or exceed the maximum depth of the descent of the probe assembly 14 into the water. The measurement of the water property must be concluded before conductor 18 is completely unwound from spool 42 as the conductor 18 will break when it is completely unwound due to the weight of the probe assembly.

The conductor 18 continues to unwind from spool 48 as the helicopter moves from its position at the time of probe launch so that the descent of the probe assembly 14 into the water will not be influenced by either the vertical or horizontal motion of the helicopter. As the helicopter moves, more of conductor 18 will unwind from spool 48 thus leaving the position of the probe unchanged from the position at which it entered the water.

The purpose of deploying the probe 14 into the water is to obtain a measurement of a property of the water and preferably a graphical record of the value of that property as a function of the depth of water. It is to be noted that since the rate of descent of the probe in the water is a known quantity, the depth of the water and the position of the probe can be correlated at any time to the time of descent of the probe following the "splash down" or point of entry of the probe assembly into the water. As illustrated in FIG. 7, the probe assembly carries a property sensing element or thermistor 16 which is electrically connected between a terminal A" and the sea electrode B. By means of wires 30a, 30b and 30c of the three wire cable 18 the thermistor 16 and the sea electrodes B and C within the probe are electrically connected with a measuring and recording system housed aboard the helicopter. This measuring system is now described with reference to the schematic diagram of FIG. 5. The elements of the circuit illustrated in FIG. 5 are all located abroad the helicopter with the exception of the thermistor 16 represented by resistance $R_{TH}$, and the resistances $R_{L1}$, $R_{L2}$ and $R_{L3}$ of the wires 30a, 30b and 30c.

The three wire cable 18 connects the elements in the probe assembly 14 to the circuitry located in the helicopter. Wire 30c of the three-wire conductor connects sea electrode C to the common or ground terminal C' of the measuring system. The other two wires 30a and 30b of the conductor 18 connect sea electrode B and the thermistor to the terminals A' and B' of the bridge measuring circuit. A bridge measuring circuit of the type shown has been described in the last-mentioned U.S. Pat. 3,341,757, which is hereby incorporated by reference to this application.

In this circuit the varying resistance to be determined is the resistance $R_{TH}$ of the thermistor 16 located in the probe assembly, the resistance of which is a function of the temperature of the water. The bridge circuit is balanced by servo means (not shown) providing position information which is a function of the ratio between a reference voltage $f$ and a measured current at the bridge output. It will be understood that other water properties may also be measured and recorded by the apparatus of this invention, wherein the resistance of the sensing element is a function of the property being measured.

The multiarm bridge is formed of resistances $R_{TH}$, $R_{L2}$, R10, R9, R8, R7 (shunted by variable resistors R5 and R6), R4, R3, R2, R11 and $R_{L1}$ whereby the output current is a linear function of the inverse of the resistance $R_{TH}$. By utilizing a fixed reference voltage F in one arm, a balanced bridge with compensation of resistances $R_{L1}$ and $R_{L2}$ of lead wires 30a and 30b results and the variable current is used as the rebalance quantity. To use this bridge, we must maintain null and determine the current ratio to the reference voltage. To maintain the null (balance) position, the bridge output terminals are connected to the input terminals 1 and 2 of a differential amlifier A1. The output 4 of the amplifier A1 is used as a source of supply current for the bridge. The supply current circuit is switched on to ground via the sea electrode switch B and C at the opposite end of the bridge. The input to the amplifier is connected to give negative feed back. Provided the gain of the amplifier is sufficiently high, the voltage difference at the input of the amplifier A1 is negligibly small and bridge balance is maintained.

To determine ratio of output current to the reference voltage $f$, the voltage drop in one arm of the bridge is first applied to terminals D1 and D2 of a servo amplifier (not shown) where it is amplified and then to a servo motor (also not shown). The servo motor is mechanically linked to the slide arm of variable resistance R6 to restore the bridge to the balance condition. Capacitors C12 and C13 serve to filter external R.F. signals from the bridge circuit. The travel of the slide arm of R6 bridge provides an analog representation of the water temperature under measurement. To record this analog magnitude, the output of the servo motor is mechanically coupled to a conventional recorder (not shown) which prints a record of the water property as a function of the probe falling into the water, at a known rate and the changes in the water temperature causing a corresponding variation in the value of $R_{TH}$. The recording produced is, therefore, an indication of the water property as a function of water depth, as the recorder chart drive speed corresponds to the rate of descent of the probe.

In one aspect of this invention the bridge and recorder operation is initiated when the probe assembly lands in the water. When the probe assembly is inserted into the launching device to be deployed from the helicopter, a cam (not shown) closes cam operated switch S1 to energize the relay K1.

The energization of relay K1 reverses normal positions (as shown in the drawing) of switches S10–S16 and initiates the launch operation causing the probe assembly 14 to be deployed from the helicopter. The energization of relay K1 also applies through S13, a potential to lamp L1 to indicate that the launching operation is about to proceed.

Prior to splash-down of the probe, the bridge circuit is connected to ground through relatively high resistor R13 and normally closed switch S5 and through relatively high resistor R12 and normally closed switch S6. At splash-down, however, the thermistor $R_{TH}$ is connected to ground via conductive sea path between sea electrodes B and C and thermistor $R_{TH}$ is thereby connected into the measuring arm of the bridge.

The network consisting of the resistances R12, R13, R11, $R_{L1}$ and $R_{L2}$ and $R_{TH}$ is convertible from a delta to a star which inserts equal resistances into the two bridge arms. The equivalent resistance is independent of the absolute values of resistances $R_{L1}$, $R_{TH}$ and $R_{L2}$. The balance point of the bridge prior to splash down is set to correspond to a resistance value of $R_{TH}$ at 62° F.

Prior to splash down, the output of amplifier A1 is saturated with a positive voltage. When the probe assembly lands in the water, the current is supplied to the bridge through the lower resistance so that the output of amplifier A1 is suddenly decreased. A differentiating circuit comprising resistor R1 and capacitor C1 produces a negative first derivative signal of the output of amplifier A1.

This derivative signal is coupled via R15 to the base of normally non-conducting transistor Q1 and makes the same conductive. The collector of transistor Q1 is coupled through resistor R16 to the base of normally non-conducting transistor Q2 and turns the same to the conducting state. The conduction of transistor Q2 causes the energization of relay K2A and K2B (magnetically latched). When relay K2A is energized, contact S3 is closed to apply a voltage to chart drive motor M, which in turn initiates the operation of the recorder. As mentioned above, the splash down signal derived in this manner may be transmitted back to the probe assembly 14 to release the parachute assembly 20 from the probe assembly.

A logic circuit for triggering the recorder is provided which includes a combination of relay K2B with relay K3. Relay K3 of FIG. 6 is energized only upon the condition that K2B is energized by the splash down of the probe assembly described above, and contacts S4 to S9 reverse their positions, whereas relay K1 is not energized. This condition will occur while the recorder is starting the measuring operation. Current to energize relay K3 is supplied through a transistor Q3 which is caused to conduct when contact S11 is closed, and the energizing of relay K2B closes contact S7 to complete the ground return circuit Y of the coil of relay K3.

A normally closed pushbutton switch S2 connects terminal B' via S15 to ground. Prior to the launching of the probe assembly, the pushbutton S2 is momentarily depressed causing the recorder to run for a period of approximately two seconds on a check cycle.

The various D.C. voltages required for the operation of the relays, lamps, motors, amplifiers, transistors and bridge measuring circuit are all supplied from a power supply shown in FIG. 5. As the circuit configuration of this power supply is relatively conventional in design, it will be only briefly described here. An alternating voltage source is applied across the primary winding P1 of a transformer T1. Secondary winding W2 is coupled to rectifier CR4, filter capacitor C3 and Zener diodes CR5 and CR6 to produce the 3 volt D.C. signal utilized in the bridge measuring circuit. Another secondary winding W1 is coupled through a full wave bridge rectifier CR1, diode CR2, filter capacitors C7, C8 and C9 and their associated resistances R26, R27, R28, R29 and R30, and Zener diodes CR7 and CR8, to produce the relay and motor operating voltages as well as the supply voltages for amplifier A1 and transistors Q1, Q2 and Q3.

Although only a preferred embodiment of this invention has been illustrated and described, many modifications thereof will be obvious to those skilled in the art. Accordingly, the invention should not be limited except as defined in the appended claims.

What is claimed is:

1. In an apparatus for measuring and recording the property of a body of fluid, such as sea-water, of the type including a probe means connected by a conductor means to an airborne vehicle and adapted to be launched therefrom into said body of fluid, in which said probe means carries a sensing resistance element having a resistance that is a function of the property of said fluid; the improvement comprising first and second electrodes on said probe means adapted to be electrically connected through said fluid, said conductor means being respectfully connected to said resistance element and to said first and second electrodes, a multi-arm bridge circuit on said airborne vehicle, a current source for supplying said bridge circuit, said current source comprises an amplifier means in circuit relation with said bridge circuit, means for balancing said bridge circuit, means for recording the position information of said balancing means, said conductor means connecting said resistance sensing element into one arm of said bridge and also connecting said electrodes between one terminal of said current source and said bridge for initiating measuring operation when said probe falls into said fluid body, and means for initiating operation of said recording means upon the landing of said probe in the body of fluid, said means for initiating operation of said recording means comprising means for producing a derivative signal of the output of said amplifier for initiating operation of said recording means.

2. The apparatus as claimed in claim 1, comprising switch means responsive to said derivative signal, said recording means being responsive to the condition of said switch means.

3. The apparatus as claimed in claim 2, wherein said switch means comprises a transistor biased into a conductive state upon the receipt of a negative signal from said derivative signal producing means, and relay means in circuit relation with said transistor, said relay means being energized when said transistor is in the conductive state.

4. An apparatus for measuring and recording the property of a body of water from an airborne vehicle, said apparatus comprising a measuring probe adapted to be launched from said vehicle for free descent into said body, a measuring circuit in said vehicle, and a multi-conductor cable extending between said probe and said measuring circuits, said multi-conductor cable having first, second and third conductors, said probe comprising a sensing resistance element having a resistance which varies as a function of a property of said body when said probe is immersed therein, means connecting said element between said first and second conductors and separate sea electrodes connected to said second and third conductors whereby a conduction path is established between second and third conductors when said probe is immersed in said body, said measuring circuit comprising a resistive bridge circuit, means connecting said first and second conductors and resistance element in series in one arm of said bridge circuit, and said second conductor in series in an adjacent arm of said bridge circuit, whereby said sea electrode connected to said second conductor comprises one junction of said bridge circuit, said measuring circuit further comprising a source of current for said bridge circuit, means connecting said source of current between the opposite junction of said bridge circuit and a point of reference potential, means for connecting said third conductor to said point, whereby a current path is established for said bridge circuit upon immersion of said probe in said body to effect a conduction path between said sea electrodes, and means responsive to the potential between the remaining junctions of said bridge circuit for balancing said bridge circuit.

5. The apparatus of claim 4 wherein said source of current comprises an amplifier, and said means for balancing said bridge circuit comprises means connecting the input of said amplifier between said remaining bridge junctions, whereby said current is continuously varied to balance said bridge circuit.

6. The apparatus of claim 5 wherein said bridge circuit further comprises recording means, differentiating circuit means connected to the output of said amplifier, whereby a pulse is produced by said differentiating circuit upon the initial immersion of said probe in said body due to the establishing of a conducting path between said sea electrodes, and means connected to said differentiating circuit for initiating operation of said recording means upon the occurrence of said pulse.

7. The apparatus of claim 4 wherein said measuring circuit further comprises a plurality of resistors, means connecting said resistors between said point of reference potential and a plurality of separate points in said bridge circuit whereby the current in said bridge circuit is substantially independent of the resistance of said sensing resistance, and means connected to said bridge circuit and responsive to a change of current therein resulting from the establishing of a conducting path between said sea electrodes for operatively disconnecting said plurality of resistors from said bridge circuit, whereby said measuring circuit has an output corresponding to a predetermined resistance of said sensing element prior to immersion of said probe in said body, and an output corresponding to the actual resistance of said sensing element subsequent to the immersion of said probe in said body, and an output corresponding to the actual resistance of said sensing element subsequent to the immersion of said probe in said body.

References Cited

UNITED STATES PATENTS

| | | | |
|---|---|---|---|
| 2,715,872 | 8/1955 | Rlas | 244—142X |
| 3,339,407 | 4/1965 | Campbell et al. | 73—170(O) |

JERRY W. MYRACLE, Primary Examiner